US012812611B2

(12) United States Patent
Takahashi et al.

(10) Patent No.: US 12,812,611 B2

(45) Date of Patent: Nov. 24, 2026

(54) TERMINAL, RADIO COMMUNICATION METHOD, BASE STATION, AND SYSTEM THAT CAN REALIZE SUITABLE PUCCH REPEATED TRANSMISSION

(71) Applicant: NTT DOCOMO, INC., Tokyo (JP)

(72) Inventors: Yuki Takahashi, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 223 days.

(21) Appl. No.: 18/683,685

(22) PCT Filed: Aug. 17, 2022

(86) PCT No.: PCT/JP2022/031028

§ 371 (c)(1),
(2) Date: Feb. 14, 2024

(87) PCT Pub. No.: WO2023/022163

PCT Pub. Date: Feb. 23, 2023

(65) Prior Publication Data

US 2025/0133541 A1 Apr. 24, 2025

(30) Foreign Application Priority Data

Aug. 20, 2021 (JP) ................................ 2021-135132

(51) Int. Cl.
*H04W 72/0446* (2023.01)
*H04W 72/21* (2023.01)

(52) U.S. Cl.
CPC ....... *H04W 72/0446* (2013.01); *H04W 72/21* (2023.01)

(58) Field of Classification Search
CPC .......................... H04W 72/0446; H04W 72/21
See application file for complete search history.

(56) References Cited

U.S. PATENT DOCUMENTS 11,930,479 B2 * 3/2024 Mondal ................. H04W 16/02
12,040,930 B2 * 7/2024 Park ...................... H04L 1/1896
(Continued)

OTHER PUBLICATIONS

International Search Report issued in PCT/JP2022/031028 on Oct. 25, 2022 (5 pages).
(Continued)

*Primary Examiner* — Chandrahas B Patel
(74) *Attorney, Agent, or Firm* — Osha Bergman Watanabe & Burton LLP

(57) ABSTRACT

A terminal according to an aspect of the present disclosure includes: a control section that determines, based on at least one of a radio resource control (RRC) information element (IE), a type of uplink control information (UCI) carried by a physical uplink control channel (PUCCH), downlink control information, and a medium access control (MAC) control element (CE), one scheme of a first scheme for respectively transmitting a plurality of repetitions of the PUCCH over a plurality of slots and a second scheme for respectively transmitting a plurality of repetitions of the PUCCH over a plurality of sub-slots; and a transmitting section that transmits the plurality of repetitions according to the scheme. According to the aspect of the present disclosure, it is possible to realize suitable PUCCH repeated transmission.

6 Claims, 6 Drawing Sheets

(56) References Cited

U.S. PATENT DOCUMENTS

| | | | | |
|---|---|---|---|---|
| 12,289,169 | B2 * | 4/2025 | Yin | H04L 5/0053 |
| 2020/0383105 | A1 | 12/2020 | Park et al. | |

OTHER PUBLICATIONS

Written Opinion of the International Searching Authority issued in PCT/JP2022/031028 on Oct. 25, 2022 (4 pages).
NTT DOCOMO, Inc.; "Discussion on HARQ-ACK feedback enhancements for Rel. 17 URLLC"; 3GPP TSG RAN WG1 #106-e, R1-2107851; e-Meeting; Aug. 16-27, 2021 (10 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in counterpart Japanese Patent Application No. 2023-542419 mailed on May 26, 2026 (7 pages).
Nokia, Nokia Shanghai Bell; "HARQ-ACK Feedback Enhancements for URLLC/IIoT"; 3GPP TSG RAN WG1 #106-e, R1-2106636; e-Meeting; Aug. 16-27, 2021 (29 pages).
3GPP TS 38.213 V16.6.0; "3rd Generation Partnership Project; Technical Specification Group Radio Access Network; NR; Physical layer procedures for control (Release 16)"; Jun. 2021; pp. 50-54,98-99 (10 pages).

* cited by examiner

TERMINAL, RADIO COMMUNICATION METHOD, BASE STATION, AND SYSTEM THAT CAN REALIZE SUITABLE PUCCH REPEATED TRANSMISSION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). The specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8)”, April 2010

SUMMARY OF INVENTION

Technical Problem

In a future radio communication system (for example, NR), it is studied that a UE repeatedly transmits a PUCCH in order to improve reliability of the PUCCH. The repeated transmission of the PUCCH may be called PUCCH repetition.

However, according to the NR specifications in the past, a method of determining whether to transmit the PUCCH repetition for each slot or for each sub-slot is unclear. If this method is unclear, the PUCCH repetition cannot be suitably realized and communication quality/communication throughput are likely to be deteriorated.

Therefore, an object of the present disclosure is to provide a terminal, a radio communication method, and a base station that can realize suitable PUCCH repeated transmission.

Solution to Problem

A terminal according to an aspect of the present disclosure includes: a control section that determines, based on at least one of a radio resource control (RRC) information element (IE), a type of uplink control information (UCI) carried by a physical uplink control channel (PUCCH), downlink control information, and a medium access control (MAC) control element (CE), one scheme of a first scheme for respectively transmitting a plurality of repetitions of the PUCCH over a plurality of slots and a second scheme for respectively transmitting a plurality of repetitions of the PUCCH over a plurality of sub-slots; and a transmitting section that transmits the plurality of repetitions according to the scheme.

Advantageous Effects of Invention

According to the aspect of the present disclosure, it is possible to realize suitable PUCCH repeated transmission.

DESCRIPTION OF EMBODIMENTS (Pucch Format)

Figure 1:
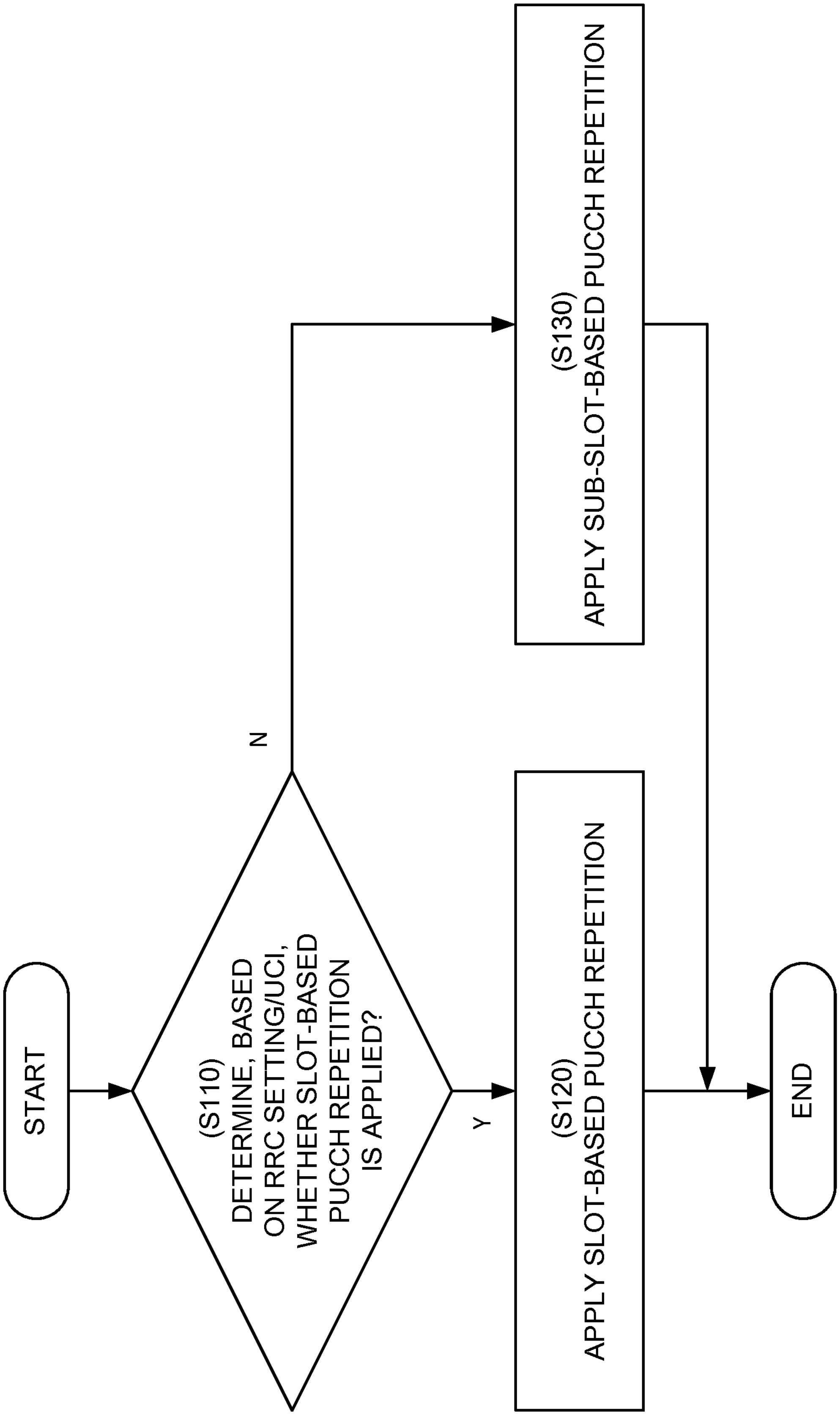
FIG. 1 is a diagram illustrating an example of a first embodiment.

In a future radio communication system (for example, Rel. 15 or later, 5G, or NR), a configuration (also referred to as format or PUCCH format (PF)) for an uplink control channel (for example, PUCCH) used for transmission of uplink control information (UCI) has been studied. For example, in Rel. 15 NR, it is studied to support 5 kinds of PFs 0 to 4. Note that names of PFs explained below are merely illustrations and different names may be used.

For example, PFs 0 and 1 are PFs used for transmission of up to UCI of two bits or less (up to two bits). For example, the UCI may be at least one of delivery acknowledgement information (also referred to as Hybrid Automatic Repeat reQuest-Acknowledgement (HARQ-ACK), acknowledgement (ACK), negative-acknowledgement (NACK), or the like) and a scheduling request (SR). Since it is possible to allocate PF0 to one or two symbols, PF0 is also called short PUCCH, sequence-based short PUCCH, or the like. On the other hand, since PF1 can be allocated to four to fourteen symbols, PF1 is also called long PUCCH or the like. PF0 may use a cyclic shift based on at least one of an initial cyclic shift (CS) index, a value of UCI, a slot number, and a symbol number and transmit a sequence obtained by a cyclic shift of a base sequence. In PF1, a plurality of user terminals may be subjected to code division multiplexing (CDM) in the same physical resource block (PRB) by block spread in a time domain using at least one of a CS and a time domain (TD)-orthogonal cover code (OCC).

PFs2-4 are PFs used for transmission of UCI of more than two bits) (for example, channel state information (CSI)) or at least one of CSI, HARQ-ACK, and SR). Since it is possible to allocate PF2 to one or two symbols, PF2 is also called short PUCCH or the like. On the other hand, since it is possible to allocate PF3 and PF4 to four to fourteen symbols, PF3 and PF4 are also called long PUCCH or the like. In PF4, a plurality of user terminals may be subjected to CDM using block spreading (frequency domain (FD)-OCC) before DFT.

Intra-slot frequency hopping may be applied to PF1, PF3, and PF4. When the length of the PUCCH is represented as $N_{symb}$, the length before frequency hopping (first hop) may be floor ($N_{symb}/2$) and the length after frequency hopping (second hop) may be ceil ($N_{symb}/2$).

Waveforms of PF0, PF1, and PF2 may be Cyclic Prefix (CP)-Orthogonal Frequency Division Multiplexing (OFDM). Waveforms of PF3 and PF4 may be Discrete Fourier transform (DFT)-spread(s)-OFDM.

Allocation of resources (for example, PUCCH resources) used in transmission of the uplink control channel is performed using higher layer signaling and/or downlink control information (DCI). Here, the higher layer signaling only has to be, for example, at least one of RRC (Radio Resource Control) signaling, system information (for example, at least one of RMSI: Remaining Minimum System Information, OSI: Other System Information, MIB: Master Information Block, and SIB: System Information Block), and broadcast information (physical broadcast channel (PBCH)).

In the NR, the number of symbols (which may be called PUCCH allocation symbol, PUCCH symbol, or the like) allocated to the PUCCH can be determined according to any one of or a combination of slot specific, cell specific, and user terminal specific. Since it is expected that a communication distance (coverage) increases as the number of PUCCH symbols is increased, for example, an operation of increasing the number of symbols in a user terminal farther from a base station (for example, eNB or gNB) is assumed.

(HARQ-ACK Feedback)

In the NR, a mechanism has been studied in which a user terminal (user equipment (UE)) performs feedback (also referred to as report, transmission, or the like) of delivery confirmation information (also referred to as hybrid automatic repeat request-acknowledge (HARQ-ACK), ACKnowledge/Non-ACK (ACK/NACK), HARQ-ACK information, A/N, or the like) for a downlink shared channel (also referred to as physical downlink shared channel (PDSCH) or the like).

For example, in the NR Rel. 15, a value of a certain field in DCI (for example, DCI format 1_0 or 1_1) used for PDSCH scheduling indicates feedback timing of HARQ-ACK to the PDSCH. When the UE transmits, in a slot #n+k, the HARQ-ACK for the PDSCH received in a slot #n, the value of the certain field may be mapped to a value of k. The certain field is called, for example, PDSCH-HARQ feedback timing indication (PDSCH-to-HARQ_feedback timing indicator) field or the like.

In the NR Rel. 15, a PUCCH resource used for feedback of HARQ-ACK to the PDSCH is determined based on a value of a certain field in DCI (for example, DCI format 1_0 or 1_1) used for scheduling the PDSCH. The certain field may be called, for example, PUCCH resource indication (PUCCH resource indicator (PRI)) field, ACK/NACK resource indication (ACK/NACK resource indicator (ARI)) field, or the like. The value of the certain field may be called PRI, ARI, or the like.

PUCCH resources mapped to values of the certain field may be configured in the UE in advance by a higher layer parameter (for example, ResourceList in PUCCH-ResourceSet). The PUCCH resources may be configured in the UE for each set (PUCCH resource set) including one or more PUCCH resources.

In the NR Rel. 15, it is studied that the UE does not expect to transmit more than one uplink control channel (Physical Uplink Control Channel (PUCCH)) having the HARQ-ACK in a single slot.

Specifically, in the NR Rel. 15, one or more HARQ-ACKs of the single slot are mapped to a single HARQ-ACK codebook and the HARQ-ACK codebook may be transmitted on a PUCCH resource indicated by the most recent (last) DCI.

Here, the HARQ-ACK codebook may include a bit for HARQ-ACK in at least one unit of a time domain (for example, a slot), a frequency domain (for example, a component carrier (CC)), a spatial domain (for example, a layer), a transport block (TB), or a group (code block group (CBG)) of code blocks configuring the TB. Note that the CC is also called cell, serving cell, carrier, or the like. The bit is also called HARQ-ACK bit, HARQ-ACK information, HARQ-ACK information bit, or the like.

The HARQ-ACK codebook is also called PDSCH-HARQ-ACK codebook (pdsch-HARQ-ACK-Codebook), codebook, HARQ codebook, HARQ-ACK size, or the like.

The number (size) of bits or the like included in the HARQ-ACK codebook may be determined in a semi-static or dynamic manner. The semi-static HARQ-ACK codebook is also called type-1 HARQ-ACK codebook, semi-static codebook, or the like. The dynamic HARQ-ACK codebook is also called type-2 HARQ-ACK codebook, dynamic codebook, or the like.

Which of the type 1 HARQ-ACK codebook or the type 2 HARQ-ACK codebook is used may be set in the UE by higher layer parameters (for example, pdsch-HARQ-ACK-Codebook).

In the case of the type 1 HARQ-ACK codebook, the UE may feed back, in a certain range (for example, a range set based on the higher layer parameters), HARQ-ACK bits corresponding to the certain range irrespective of presence or absence of PDSCH scheduling.

The certain range may be determined based on at least one of the number of CCs set or activated in the UE, the number of TBs (the number of layers or ranks), the number of CBGs per one TB, and presence or absence of application of spatial bundling for a certain period (for example, a set of a certain number of occasions for receiving a candidate PDSCH or a certain number of monitoring occasions of a PDCCH). The certain range is also called HARQ-ACK bundling window, HARQ-ACK feedback window, bundling window, feedback window, or the like.

In the Type 1 HARQ-ACK codebook, the UE feeds back the NACK bits if within a certain range, even if there is no scheduling of PDSCH for the UE. Therefore, when the type 1 HARQ-ACK codebook is used, it is also assumed that the number of HARQ-ACK bits to be fed back increases.

On the other hand, in the case of the Type 2 HARQ-ACK codebook, the UE may feed back HARQ-ACK bits for a scheduled PDSCH in the certain range.

When code block group (CBG) based (CBG-based) transmission (CBG-based HARQ-ACK codebook determination) is not set for the UE by higher layer parameters (PDSCH code block group transmission information element, PDSCH-CodeBlockGroupTransmission), the UE assumes transport block (TB) based (TB-based) transmission (TB-based HARQ-ACK codebook determination). That is, the UE generates HARQ-ACK information bits for each TB.

When a higher layer parameter of a PDSCH code block group transmission information element is provided to a serving cell (Component Carrier: CC), the UE receives a PDSCH including a plurality of CBGs of one TB. The PDSCH code block group transmission information element includes a maximum number of CBGs (maxCodeBlock-GroupsPerTransportBlock) in one TB. The UE generates, for the TB reception of the serving cell, HARQ-ACK information bits of a plurality of CBGs and generates a HARQ-ACK codebook including a maximum number of HARQ-ACK information bits of the CBGs.

The UE may transmit the one or more HARQ-ACK bit determined (generated) based on the Type 1 or Type 2 HARQ-ACK codebook, using at least one of an uplink control channel (Physical Uplink Control Channel (PUCCH)) and an uplink shared channel (Physical Uplink Shared Channel (PUSCH)).

(PUSCH Repeated Transmission)

In the Rel. 15, repeated transmission is supported in data transmission. For example, a base station (network (NW), gNB) may repeatedly transmit DL data (for example, downlink shared channel (PDSCH)) for a given number of times. Alternatively, a UE may repeat UL data (for example, uplink shared channel (PUSCH)) for a given number of times.

The UE may be scheduled for a certain number of repeated PUSCH transmissions by a single DCI. The number of repetitions is also called a repetition factor K or an aggregation factor K.

An n-th repetition is also called n-th transmission occasion and the like and may be identified by a repetition index k ($0 \leq k \leq K-1$). Repeated transmission may be applied to a PUSCH dynamically scheduled by DCI (for example, a dynamic grant-based PUSCH), or may be applied to a set grant-based PUSCH.

The UE semi-statically receives information indicating the repetition factor K (for example, aggregationFactorUL or aggregationFactorDL) by higher layer signaling. Here, the higher layer signaling may be, for example, any of radio resource control (RRC) signaling, medium access control (MAC) signaling, broadcast information, and so on, or a combination thereof.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), or the like.

The UE controls PDSCH reception processing (for example, at least one of reception, demapping, demodulation, and decoding) or PUSCH transmission processing (for example, at least one of transmission, mapping, modulation, and code) in K continuous slots based on at least one of the following field valued (or information indicated by the field value) in the DCI:

- the allocation of time-domain resource (such as the start symbol and the number of symbols in each slot, for example);
- the allocation of frequency-domain resource (for example, a certain number of resource blocks (RB) or a certain number of resource block groups (RBGs));
- the modulation and coding scheme (MCS) index;
- the configuration of the demodulation reference signal (DMRS) of PUSCH; and
- PUSCH spatial relation info, or the state of transmission configuration indication (TCI) or transmission configuration indicator (TCI-state).

The same symbol allocation may be applied between continuous K slots. The UE may determine the symbol allocation in each slot based on the start symbol S and the number of symbols L (for example, start and length indicator (SLIV)) determined based on the value m of a certain field (for example, a time domain resource allocation list (TDRA) field) in the DCI. Note that the UE may determine the first slot based on the K2 information determined based on the value m of a certain field (for example, the TDRA field) of the DCI.

On the other hand, the redundancy versions (RVs) applied to the TBs based on the same data may be the same or at least partially different among the continuous K slots. For example, the RV applied to the TB in the n-th slot (transmission occasion, repetition) may be determined based on the value of a certain field (for example, the RV field) in the DCI.

In Rel. 15, a PUSCH can be repeatedly transmitted over a plurality of slots (in units of slots). In the Rel. 16 and later, repeated transmission of a PUSCH is supported in a unit shorter than a slot (for example, in units of sub-slots, in units of mini slots, or in units of a certain number of symbols).

The UE may determine the symbol allocation of PUSCH transmission (for example, PUSCH with k=0) in a certain slot based on the start symbol S and the number of symbols L determined based on the value m of a certain field (for example, the TDRA field) in the DCI of the PUSCH. Note that the UE may determine the certain slot based on the Ks information determined based on the value m of the certain field (for example, the TDRA field) of the DCI.

The UE may dynamically receive information indicating repetition factor K (for example, numberofrepetitions) using downlink control information. The repetition factor may be determined based on the value m in the certain field (for example, TDRA field) in the DCI. For example, a table in which correspondence between the bit value notification of which is performed by the DCI and the repetition factor K, the start symbol S, and the number of symbols L is defined may be supported.

The slot-based repeated transmission may be referred to as a repeated transmission type A (for example, PUSCH repetition Type A), and the sub-slot-based repeated transmission may be called repeated transmission type B (for example, PUSCH repetition Type B).

Application of at least one of a repeated transmission type A and a repeated transmission type B may set in the UE. For example, the repeated transmission type applied by the UE may be notified from the base station to the UE by higher layer signaling (for example, PUSCHRepTypeIndicator).

One of the repeated transmission type A or the repeated transmission type B may be set in the UE for each DCI format scheduling the PUSCH.

For example, for the first DCI format (for example, DCI format 0_1), when higher layer signaling (for example, PUSCHRepTypeIndicator-AorDCIFormat0_1) is set to the repeated transmission type B (for example, PUSCH-RepTypeB), the UE applies the repeated transmission type B for the PUSCH repeated transmission scheduled in the first DCI format. Otherwise (for example, when PUSCH-RepTypeB is not set or when PUSCH-RepTypA is set), the UE applies repeated transmission type A for the PUSCH repeated transmission scheduled in the first DCI format.

(PUCCH Repeated Transmission)

Extension of UE feedback for HARQ-ACK is studied for extension of Industrial Internet of Things (IoT) and ultra-reliable and low latency communication (URLLC).

Slot based PUCCH repetition is supported in PUCCH formats 1/3/4 of the Rel. 15/16.

For the PUCCH format 1, 3, or 4, the number of PUCCH repetitions N_PUCCH^repeat for repetition of PUCCH transmission can be set in the UE by respective slot number information element nrofSlots.

When N_PUCCH^repeat>1, the UE follows the following regulations 1-1 to 1-3.

[Regulation 1-1]

The UE repeats PUCCH transmissions involving UCI over N_PUCCH^repeat slots.

[Regulation 1-2]

The PUCCH transmissions in each of the N_PUCCH^repeat slots have the same number of continuous symbols. The number of symbols is provided by a number-of-symbols information element nrofsymbols in the PUCCH format 1 information element PUCCH-format 1, a number-of-symbols information element nrofsymbols in the PUCCH format 3 information element PUCCH-format 3, or a number-of-symbols information element nrofsymbols in the PUCCH format 3 information element PUCCH-format 3.

[Regulation 1-3]

The PUCCH transmissions in each of the N_PUCCH^repeat slots have the same first symbol (start symbol index). The first symbol is provided by a start symbol index information element startingSymbolIndex in the PUCCH format 1 information element PUCCH-format 1, or a start symbol index information element startingSymbolIndex in the PUCCH format 3 information element PUCCH-format 3, or a start symbol index information element startingSymbolIndex in the PUCCH format 3 information element PUCCH-format 3.

In the Rel. 16, a sub-slot based HARQ-ACK PUCCH is supported.

If two PUCCH configurations PUCCH-Config are provided to the UE, the UE follows the following regulations 2-1 to 2-2.

[Regulation 2-1]

If a sub-slot length sub-slotLengthForPUCCH is provided to the UE in the first PUCCH-Config, a PUCCH resource for any scheduling request (SR) setting involving a priority level (priority) index of 0 or channel state information (CSI) reporting setting in any PUCCH-Config is present in the sub-slotLengthForPUCCH in the first PUCCH-Config.

[Regulation 2-2]

If a sub-slot length sub-slotLengthForPUCCH is provided to the UE in the second PUCCH-Config, a PUCCH resource for any scheduling request (SR) setting involving a priority level (priority) index of 1 or channel state information (CSI) reporting setting in any PUCCH-Config is present in the sub-slotLengthForPUCCH in the second PUCCH-Config.

If sub-slotLengthForPUCCH in PUCCH-Config is provided to the UE, the first symbol of the PUCCH resource in PUCCH-Config for multiplexing HARQ-ACKs in the PUCCH transmission is a relative value (represented as a relative value) to the first symbol of the sub-slotLengthForPUCCH symbols. In that remaining cases, the first symbol of the PUCCH resource is a relative value (represented as a relative value) to the first symbol of the slot having N_sym^slot (number of in-slot symbols) symbols.

In the Rel. 17, it is studied that sub-slot-based PUCCH repetition is supported. For example, it is studied that sub-slot-based PUCCH repetition for HARQ-ACK based on a Rel. 16 PUCCH procedure for slot-based PUCCH for application to sub-slot-based PUCCH is supported, dynamic repetition indication is also supported for sub-slot-based PUCCH in Rel. 17, and PUCCH repetition for PUCCH formats 0 and 2 is supported for sub-slot-based PUCCH repetition.

For extension of PUCCH reliability, it is studied that multi-TRP intra-slot repetition (Multi-TRP intra-slot repetition, scheme 3) for all PUCCH formats is supported and the same PUCCH resource carrying UCI is repeated for X=2 (continuous) sub-slots in a slot.

In the Rel. 17, a dynamic PUCCH repetition factor indication is studied. The following two options for support of the dynamic PUCCH repetition factor indication are studied.

[Option 1](Non Involving DCI Extension)

RRC signaling for enabling setting of a PUCCH repetition factor for each PUCCH resource is extended. The PUCCH repetition factor is implicitly indicated by the DCI.

[Option 2](Involving DCI Extension)

The PUCCH repetition factor is explicitly indicated by the DCI. For example, a new field is introduced or the number of bits of an existing field (for example, PUCCH resource indicator (PRI)) in the DCI for the PUCCH repetition factor indication is increased.

As explained above, the two PUCCH repetition schemes the (Rel. 15/16 slot-based PUCCH repetition and the Rel. 17 sub-slot-based PUCCH repetition) are studied. It is unclear whether dynamic switching (dynamic switching) between the slot-based PUCCH repetition and the sub-slot-based PUCCH repetition is possible for one PUCCH resource and how to determine which of the slot-based PUCCH repetition and the sub-slot-based PUCCH repetition is applied to one PUCCH. If these rules are unclear, PUCCH transmission/reception is not appropriately performed and communication quality/communication throughput is likely to be deteriorated.

Therefore, the present inventors have conceived a method for implementing suitable PUCCH repeated transmission.

Hereinafter, embodiments according to the present disclosure will be described in detail with reference to the drawings. Radio communication methods according to the respective embodiments may be applied independently, or may be applied in combination.

In the present disclosure, "A/B/C" and "at least one of A, B and C" may be replaced with each other. In the present disclosure, cell, serving cell, CC, carrier, BWP, DL BWP, UL BWP, active DL BWP, active UL BWP, and band may be replaced with one another. In the present disclosure, index, ID, indicator, and resource ID may be replaced with one another In the present disclosure, sequence, list, set, group, flock, cluster, subset, and the like may be replaced with one another. In the present disclosure, support, control, can control, operate, and can operable may be replaced with one another.

In the present disclosure, configure, activate, update, indicate, enable, specify, and select may be replaced with one another.

In the present disclosure, the higher layer signaling may be any of, for example, radio resource control (RRC) signaling, medium access control (MAC) signaling, broadcast information, and the like, or a combination thereof. In the present disclosure, RRC, RRC signaling, RRC parameter, higher layer, higher layer parameter, RRC information element (IE), RRC message, and setting may be replaced with one another.

For example, a MAC control element (MAC CE), a MAC protocol data unit (PDU), or the like may be used for the MAC signaling. In the present disclosure, MAC CE, update command, and activation/deactivation command may be replaced with one another.

The broadcast information may be, for example, a master information block (MIB), a system information block (SIB), minimum system information (Remaining Minimum System Information (RMSI), SIB1), or other system information (OSI).

In the present disclosure, the slot-based PUCCH repetition may be transmitting a plurality of repetitions of the PUCCH (UCI) over a plurality of slots. In the present disclosure, the sub-slot-based PUCCH repetition may be transmitting a plurality of repetitions of the PUCCH (UCI) over a plurality of sub-slots.

(Radio Communication Method)

The following embodiments relate to an interaction of slot-based PUCCH repetition and sub-slot-based PUCCH repetition.

First Embodiment

In this embodiment, dynamic switching between two PUCCH repetition schemes is not performed on one configured PUCCH. Which PUCCH repetition scheme is applied to resources of the PUCCH resource may be determined based on an RRC setting/UCI type.

As shown in an example in FIG. 1, a UE may determine, based on an RRC setting/UCI (UCI type) for a PUCCH, whether slot-based PUCCH repetition is applied (S110). When it is determined that the slot-based PUCCH repetition is applied (S110: Y), the UE may apply the slot-based PUCCH repetition to the PUCCH (S120). When it is determined that the slot-based PUCCH repetition is not applied (S110: N), the UE may apply sub-slot-based PUCCH repetition to the PUCCH (S130).

Which RRC parameter is used for determining a PUCCH repetition scheme may be determined according to at least one of the following options 1-1 to 1-3.

<<Option 1-1>>

The UE may determine, for PUCCH configuration PUCCH-Config corresponding thereto, a PUCCH repetition scheme based on whether a sub-slot length sub-slotLength-ForPUCCH (sub-slot length for PUCCH and the number of symbols in a sub-slot) is set.

If the sub-slotLengthForPUCCH is configured for PUCCH-Config and a PUCCH (a PUCCH resource) is configured/indicated for repetition, the UE may follow one of the following options 1-1a and 1-1b.

[Option 1-1a]

The sub-slot-based PUCCH repetition is always applied to the PUCCH.

[Option 1-1b]

The sub-slot-based PUCCH repetition or the slot-based PUCCH repetition is applied to the PUCCH based on a UCI type. For example, when UCI carried (transmitted) by the PUCCH is HARQ-ACK, the sub-slot-based PUCCH repetition may be applied to the PUCCH. For example, if UCI carried (transmitted) by the PUCCH is CSI, the slot-based PUCCH repetition may be applied to the PUCCH.

If the sub-slotLengthForPUCCH is not set for the PUCCH-Config, the slot-based PUCCH repetition may be applied to the PUCCH.

<<Option 1-2>>

The UE may determine the PUCCH repetition scheme based on an RRC parameter (for example, PUCCH repetition type information element, PucchRepetitionType, or PucchRepetitionType-r 17) indicating a PUCCH repetition type. The PUCCH repetition type information element may be set for PUCCH resources, may be set for PUCCH formats, or may be set for PUCCH-Configs, or may be set for UCI types.

<<Option 1-3>>

The UE may determine the PUCCH repetition scheme based on PUCCH repetition number setting (the number of repetitions or repetition factor) parameter for the PUCCH resource/PUCCH format.

Different parameters for indication of the number of repetitions may be used for different PUCCH repetition schemes. A new parameter (for example, the number of sub-slots, nrofSubSlots, or nrofSubSlots-r 17) for setting the number of repetitions for the sub-slot-based PUCCH repetition may be introduced.

If the repetition number parameter (nrofSlots) for the slot based PUCCH repetition is set for PUCCH format/PUCCH resources corresponding thereto, the slot based PUCCH repetition may be applied. If the repetition number parameter for the sub-slot-based PUCCH repetition (for example, the number of sub-slots, nrofSubSlots, or nrofSubSlots-r17) is set for PUCCH format/PUCCH resources corresponding thereto, the sub-slot-based PUCCH repetition may be applied.

It may be specified that the UE does not assume that both the parameters (the number of repetitions (the number of slots) for the slot-based PUCCH repetition and the number of repetitions (the number of sub-slots) for the sub-slot-based PUCCH repetition) are simultaneously present in one PUCCH resource setting or in one PUCCH format setting.

For one PUCCH resource, if a value of a parameter in PUCCH resource setting is different from a value of the parameter in PUCCH format setting corresponding thereto, the UE may follow the following option 1-3a or 1-3b. The parameter may be a parameter indicating the number of repetitions.

[Option 1-3a]

The UE may follow a value of the parameter indicated by the PUCCH resource setting. The UE may follow a value of the parameter indicated by the PUCCH format setting.

[Option 1-3b]

The UE may apply the sub-slot based PUCCH repetition. The UE may apply the slot-based PUCCH repetition.

In the options 1-1 and 1-2, the PUCCH repetition number may be determined according to the following choices A or B.

<<Choice A>>

Different parameters for indication of the number of repetitions may be used for different PUCCH repetition schemes. For example, a new parameter (for example, the number of sub-slots, nrofSubSlots, or nrofSubSlots-r17) for setting the number of repetitions for the sub-slot-based PUCCH repetition may be introduced. An existing parameter (for example, the number of slots or nrofSlots) for setting the number of repetitions for the slot-based PUCCH repetition may be used.

If both the parameters (the number of repetitions (the number of slots) for the slot-based PUCCH repetition and the number of repetitions (the number of sub-slots) for the sub-base PUCCH repetition) are set for one PUCCH resource setting or one PUCCH format setting, which number of repetitions is applied may be based on a PUCCH repetition scheme determined according to an option 1-1 or 1-2. For example, if it is determined according to the option 1-1 or 1-2 that sub-slot-based PUCCH repetition is applied, a new parameter (for example, the number of sub-slots, nrofSubSlots, or nrofSubSlots-r17) may be applied as the number of repetitions. Otherwise, the number of slots (nrofSlots) may be applied as the number of repetitions. If there is the number of repetitions dynamically indicated by the DCI, the dynamically indicated number of repetitions may be applied.

If one PUCCH resource applied to one PUCCH repetition scheme is determined and a repetition number parameter corresponding thereto is not set for the PUCCH resource or a PUCCH format corresponding to the PUCCH resource, the UE may follow the following choice A-1 or A-2.

[Choice A-1]

The UE may treat this case as an error case. It may be specified that the UE does not assume this case.

[Choice A-2]

The UE may assume that the number of repetitions is indicated by the DCI.

[Choice B]

For different PUCCH repetition schemes, the same parameters for indication of the number of repetitions may be used. For example, a new parameter (for example, the number of sub-slots, nrofSubSlots, or nrofSubSlots-r17) may be introduced as the parameter.

The set number of repetitions may be applied to the determined PUCCH repetition scheme.

If there is a dynamically indicated number of repetitions, the dynamically indicated number of repetitions may be applied. If there is the number of repetitions dynamically indicated by the DCI, the dynamically indicated number of repetitions may be applied.

According to this embodiment, the UE can appropriately determine either the slot-based PUCCH repetition or the sub-slot-based PUCCH repetition and can appropriately determine the number of repetitions.

Second Embodiment

In this embodiment, dynamic switching between two PUCCH repetition schemes is possible for one configured PUCCH. Which PUCCH repetition scheme is applied to resources of the PUCCH is determined based on an explicit dynamic indication.

Figure 2:
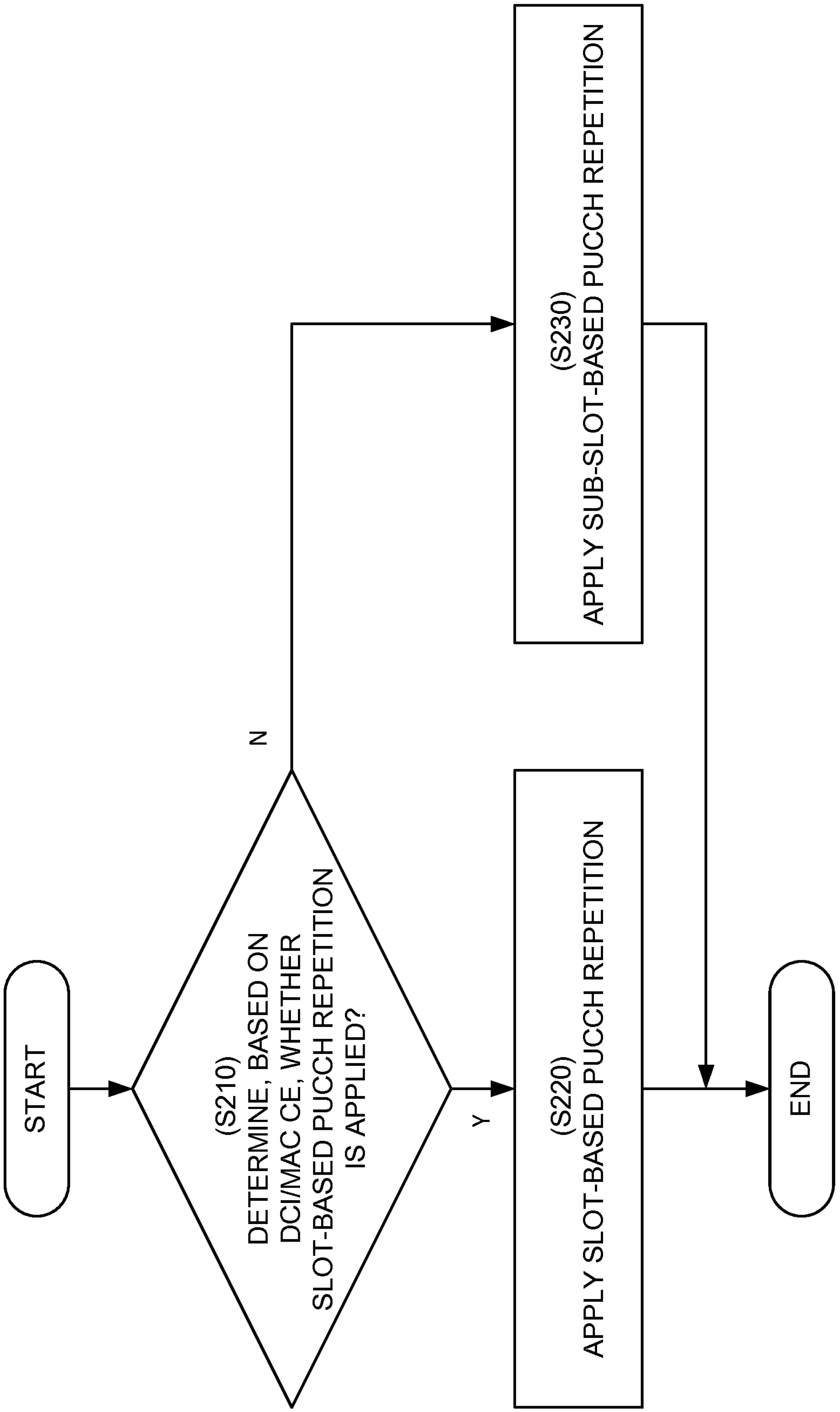
FIG. 2 is a diagram illustrating an example of a second embodiment.

As illustrated in the example in FIG. 2, the UE may determine, based on DCI/MAC CE for the PUCCH, whether the slot-based PUCCH repetition is applied (S210). If it is determined that the slot-based PUCCH repetition is applied (S210: Y), the UE may apply the slot-based PUCCH repetition to the PUCCH (S220). If it is determined that the slot-based PUCCH repetition is not applied (S210: N), the UE may apply the sub-slot-based PUCCH repetition to the PUCCH (S230).

The dynamic switching between the slot-based PUCCH repetition and the sub-slot-based PUCCH repetition may follow at least one of the following options 2-1 and 2-2.

<<Option 2-1>>

The dynamic switching may be indicated by DCI correlated with the PUCCH. The dynamic switching may be applicable to only a PUCCH resource correlated with the DCI. In other words, the dynamic switching may be applicable to only a PUCCH on a PUCCH resource set by a PUCCH resource set.

<<Option 2-2>>

The dynamic switching may be indicated by DCI/MAC CE for PUCCH repetition scheme switching. The indication of the dynamic switching may follow at least one of the following options 2-2a and 2-2b.

[Option 2-2a]

The dynamic switching indication is DCI. The DCI may be one of the following choices 1 and 2.

[[Choice 1]]

A new DCI format or an existing DCI format (involving cyclic redundancy check (CRC) scrambled by a new RNTI) involving a new radio network temporary identifier (RNTI).

[[Choice 2]]

Existing DCI format involving an existing RNTI. The dynamic switching indication in the DCI may be one of the following choices 2A and 2B.

[[[Choice 2A]]] One or more new fields.

[[[Choice 2B]]] Existing one or more unused fields based on reinterpretation of the DCI format. When the DCI does not schedule PDSCH/PUSCH, values of one or more fields (for example, HARQ process number) may be used.

[Option 2-2b]

The indication of the dynamic switching MAC CE. The MAC CE may be one of the following choices 1 and 2.

[[Choice 1]]

New MAC CE.

[[Choice 2]]

Existing MAC CE. Dynamic switching instruction in the MAC CE may be one of the following choices 2A and 2B.

[[[Choice 2A]]] New octet.

[[[Choice 2B]]] Existing octet. Reserved bits may be used for the mic switching.

The number of PUCCH repetitions (the number of repetitions or a repetition factor) for the slot-based PUCCH repetition and the sub-slot-based PUCCH repetition may follow one of the following choices A and B.

<<Choice A>>

Only one repetition number parameter is set in the PUCCH resource setting or the PUCCH format setting. The repetition number parameter may be common to the slot-based PUCCH repetition and the sub-slot-based PUCCH repetition. The number of repetitions may be applied to the slot-based PUCCH repetition and the sub-slot-based PUCCH repetition.

<<Choice B>>

Different repetition number parameters are set in the PUCCH resource setting or the PUCCH format setting. For example, there may be two repetition number parameters in the PUCCH resource setting or the PUCCH format setting. If the slot-based PUCCH repetition is indicated, the repetition number parameter (for example, the number of slots or nrofSlots) for the slot-based PUCCH repetition of the two repetition parameters may be applied. If the sub-slot-based PUCCH repetition is indicated, a repetition number parameter (for example, the number of sub-slots, nrofSubSlots, or nrofSubSlots-r17) for the sub-slot-based PUCCH repetition of the two repetition parameters may be applied.

According to this embodiment, the UE can appropriately determine either the slot-based PUCCH repetition or the sub-slot-based PUCCH repetition and can appropriately determine the number of repetitions.

Other Embodiments

Variations

In the embodiments explained above, which option/choice is used may be set by a higher layer parameter, may be reported by the UE as a UE capability, may be specified in the specifications, or may be determined by the reported UE capability and the setting of the higher layer parameter.

In embodiments explained above, different options/choices may be applied to different UCI types.

<<UE Capability Information/Higher Layer Parameter>>

A higher layer parameter (RRC IE)/UE capability corresponding to the functions (characteristics or features) in the embodiments explained above may be specified. The higher layer parameter may indicate whether a function thereof is enabled. The UE capability may indicate whether the UE supports the function.

The UE in which the higher layer parameter corresponding to the function is set may perform the function. It may be specified that "a UE for which the higher layer parameter corresponding to the function is not set does not perform the function (for example, follows the Rel. 15/16)".

A UE that has reported a UE capability indicating that the UE supports the function may perform the function. It may be specified that "a UE that has not reported the UE capability indicating that the UE supports the function does not perform the function (for example, follows the Rel. 15/16)".

When the UE reports the UE capability indicating that the UE supports the function and a higher layer parameter corresponding to the function is set, the UE may perform the function. It may be specified that "when a UE does not report the UE capability indicating that the UE supports the function or when higher layer parameter corresponding to the function is not set, the UE does not perform the function (for example, follows the Rel. 15/16)".

The UE capability may indicate whether the UE supports the sub-slot-based PUCCH repetition.

The UE capability may indicate whether the UE supports the dynamic switching between the slot-based PUCCH repetition and the sub-slot-based PUCCH repetition.

The UE capability may indicate whether the UE supports separate RRC parameters for the slot-based PUCCH repetition and the sub-slot-based PUCCH repetition.

With the UE capability/higher layer parameters, the UE can realize the functions explained above while keeping compatibility with existing specifications.

(Radio Communication System)

In the following explanation, a configuration of a radio communication system according to one embodiment of the present disclosure is explained. In this radio communication system, communication is performed using one or a combination of the radio communication methods according to the embodiments of the present disclosure.

Figure 3:
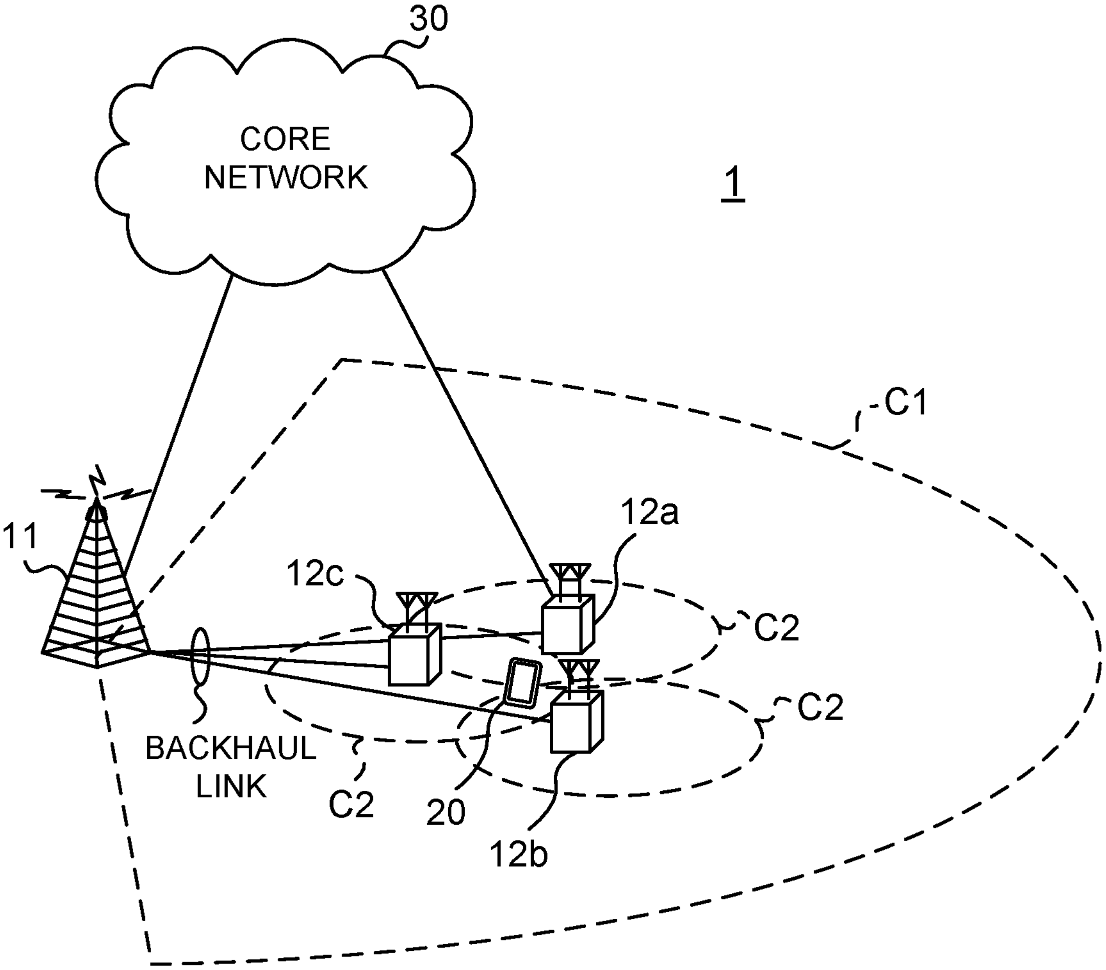
FIG. 3 is a diagram illustrating an example of a schematic configuration of a radio communication system according to an embodiment.

FIG. 3 is a diagram illustrating an example of a schematic configuration of the radio communication system according to the embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity between a plurality of radio access technologies (RATs) (multi-RAT dual connectivity (MR-DC)). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space on the basis of search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, the DMRS may also be referred to as a user terminal-specific reference signal (UE-specific reference signal).

(Base Station)

Figure 4:
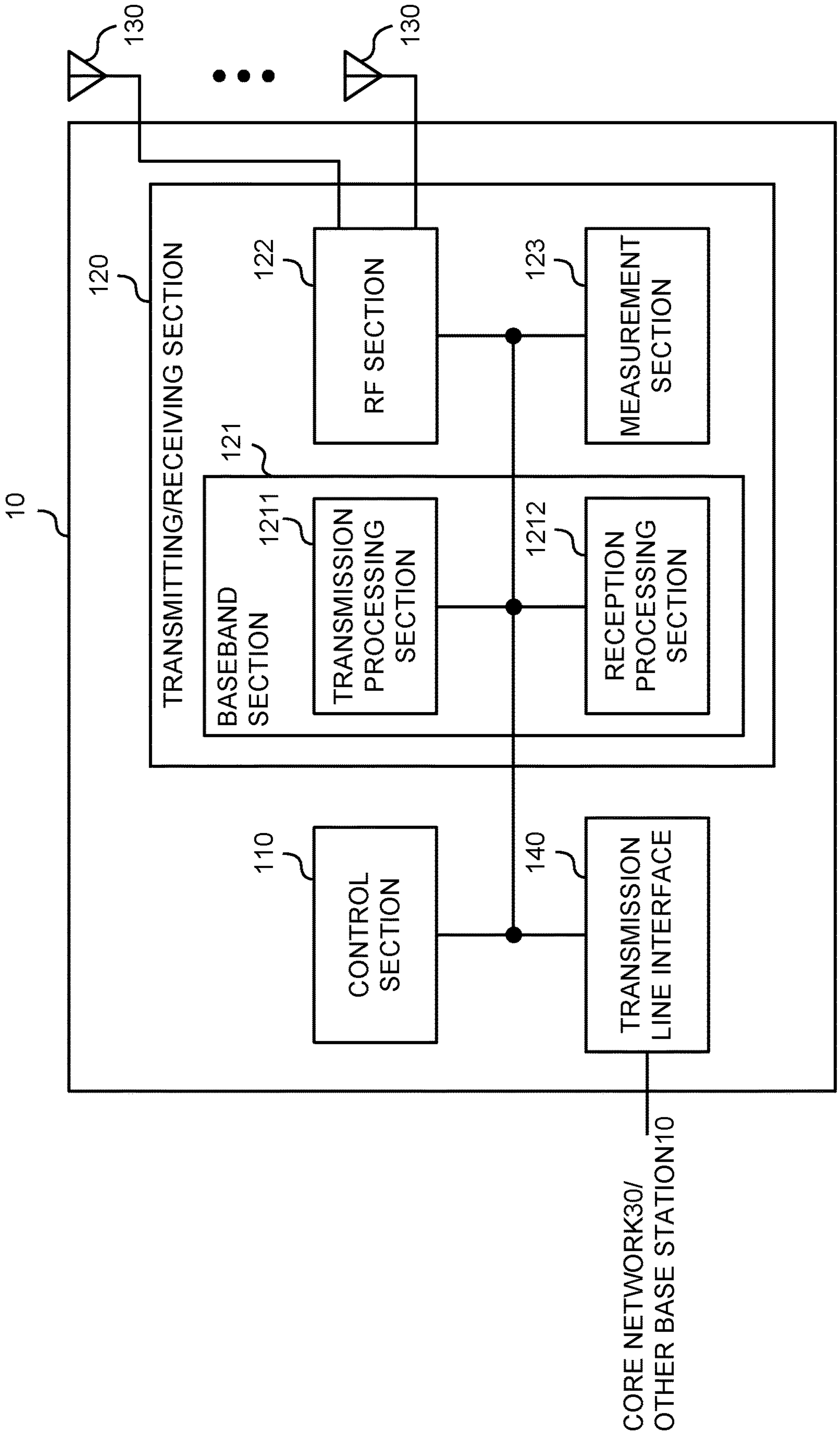
FIG. 4 is a diagram illustrating an example of a configuration of a base station according to the embodiment.

FIG. 4 is a diagram illustrating an example of a configuration of the base station according to the embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like that are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, to transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

The control section 110 may determine, based on at least one of a radio resource control (RRC) information element (IE), a type of uplink control information (UCI) carried by the PUCCH, downlink control information, and a medium access control (MAC) control element (CE), one scheme of a first scheme for transmitting a plurality of repetitions of a physical uplink control channel (PUCCH) over a plurality of slots and a second scheme for transmitting a plurality of repetitions of the PUCCH over a plurality of sub-slots. The transmitting/receiving section 120 may receive the plurality of repetitions according to the scheme.

(User Terminal)

Figure 5:
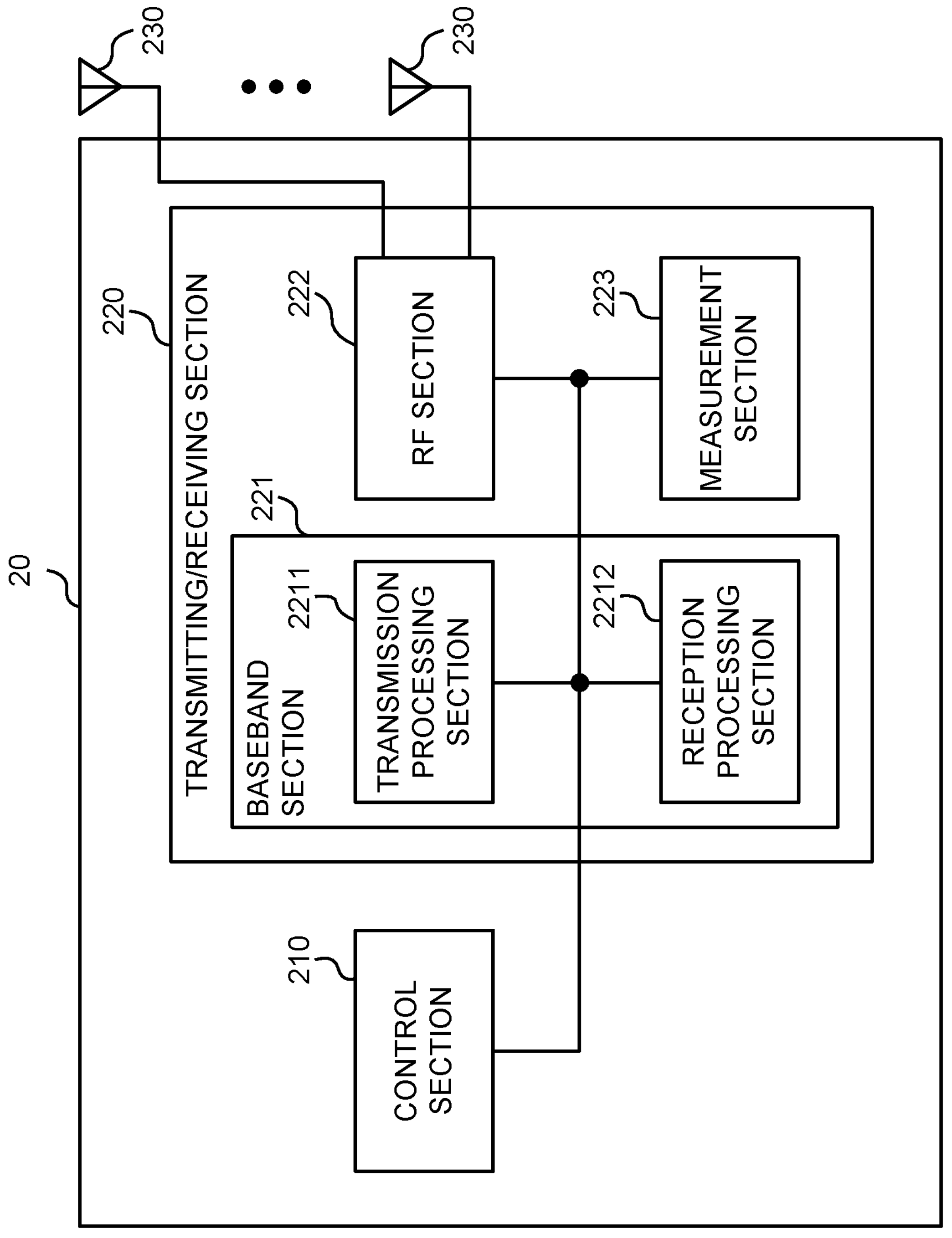
FIG. 5 is a diagram illustrating an example of a configuration of a user terminal according to the embodiment.

FIG. 5 is a diagram illustrating an example of a configuration of the user terminal according to the embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing performed by each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmission section and a reception section. The transmitting section may include the transmission processing section 2211 and the RF section 222. The reception section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

The control section 210 may determine, based on at least one of a radio resource control (RRC) information element (IE), a type of uplink control information (UCI) carried by the PUCCH, downlink control information, and a medium access control (MAC) control element (CE), one scheme of a first scheme for transmitting a plurality of repetitions of a physical uplink control channel (PUCCH) over a plurality of slots and a second scheme for transmitting a plurality of repetitions of the PUCCH over a plurality of sub-slots. The transmitting/receiving section 220 may transmit the plurality of repetitions according to the scheme.

The control section 210 may determine the scheme based on at least one of the RRC IE and the type.

The control section 210 may determine the scheme based on at least one of the downlink control information and the MAC CE.

When it is determined that the scheme is the second scheme, the control section 210 may use the set number of sub-slots as the number of repetitions.

(Hardware Configuration)

Note that the block diagrams that have been used to describe the above embodiments illustrate blocks in functional units. These functional blocks (components) may be implemented in arbitrary combinations of at least one of hardware or software. The method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and so on. For example, a functional block (component) that has a transmission function may be referred to as a transmitting section (transmitting unit), a transmitter, and the like. In any case, as described above, the implementation method is not particularly limited.

Figure 6:
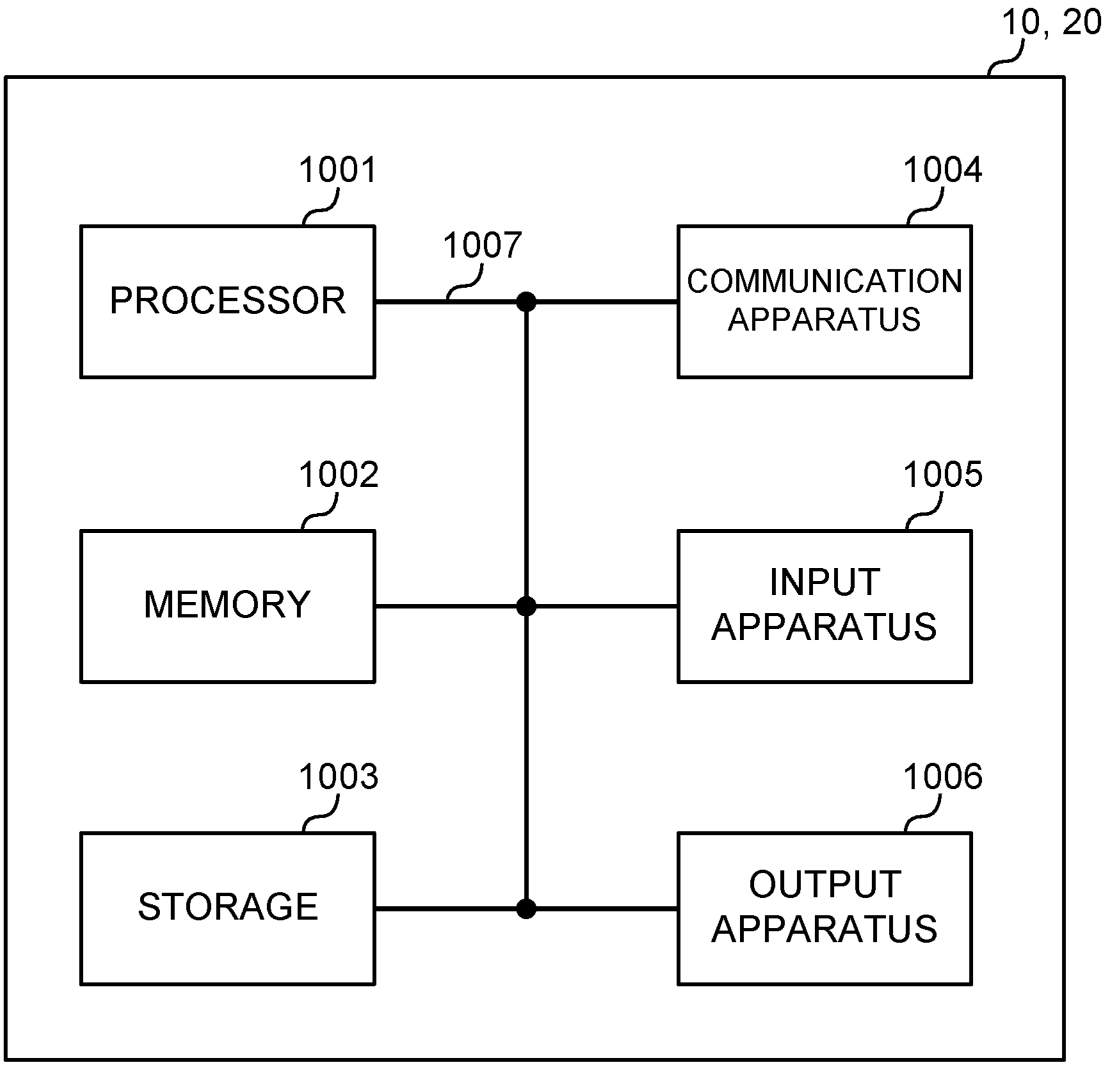
FIG. 6 is a diagram illustrating an example of hardware configurations of the base station and the user terminal according to the embodiment.

For example, the base station, the user terminal, and the like according to one embodiment of the present disclosure may function as a computer that executes the processing of the radio communication method of the present disclosure. FIG. 6 is a diagram illustrating an example of a hardware configuration of the base station and the user terminal according to the embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, an apparatus, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. The processing may be executed by one processor, or the processing may be executed by two or more processors simultaneously or sequentially, or using other methods. Note that the processor 1001 may be implemented with one or more chips.

Each function of the base station 10 and the user terminal 20 is implemented by, for example, reading certain software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM)), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, or a light emitting diode (LED) lamp). Note that the input apparatus 1005 and the output apparatus 1006 may be provided in an integrated structure (for example, a touch panel).

Furthermore, these pieces of apparatus (these apparatus), including the processor 1001, the memory 1002, and so on are connected by the bus 1007 so as to communicate information. The bus 1007 may be formed with a single bus, or may be formed with buses that vary between pieces of apparatus (between apparatus).

The base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware (at least one of these hardware).

Variations

Note that terms described in the present disclosure and terms necessary for understanding the present disclosure may be replaced with terms that have the same or similar meanings. For example, channel, symbol, and signal (signal or signaling) may be replaced with one another. The signal may be a message. The reference signal can be abbreviated as an RS, and may be referred to as a pilot, a pilot signal, and the like, depending on which standard applies. A component carrier (CC) may be referred to as a cell, a frequency carrier, a carrier frequency, and the like.

A radio frame may be formed with one or more durations (frames) in the time domain. Each of the one or more periods (frames) included in the radio frame may be referred to as a subframe. The subframe may include one or more slots in the time domain. A subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or more symbols in the time domain. The mini slot may be referred to as a sub-slot. Each mini slot may include fewer symbols than the slot. PDSCH (or PUSCH) transmitted in a time unit larger than the mini slot may be referred to as "PDSCH (PUSCH) mapping type A". A PDSCH (or PUSCH) transmitted using a mini slot may be referred to as "PDSCH (PUSCH) mapping type B".

A radio frame, a subframe, a slot, a mini slot, and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", and so on, instead of a "subframe".

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or more slots or one or more mini slots) may be the minimum time unit of scheduling. Also, the number of slots (the number of mini slots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology and may be, for example, twelve. The number of subcarriers included in the RB may be determined based on numerology.

Also, an RB may include one or more symbols in the time domain, and may be one slot, one mini slot, one subframe, or one TTI in length. One TTI, one subframe, and the like may be each formed with one or more resource blocks.

Note that one or more RBs may be referred to as a physical resource block (PRB), a sub-carrier group (SCG), a resource element group (REG), a PRB pair, an RB pair, and the like.

A resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be set within one carrier.

At least one of the set BWPs may be active and the UE may not assume to transmit or receive a certain channel/signal outside the active BWP. Note that "cell", "carrier", etc. in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be specified by a certain index.

The names used for parameters and so on in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented by using a variety of different technologies. For example, data, instructions, commands, information, signals, bits, symbols, and chips, all of which may be referenced throughout the herein-contained description, may be represented by voltages, currents, electromagnetic waves, magnetic fields or particles, optical fields or photons, or any combination of these.

Also, information, signals, and the like can be output at least either from higher layers to lower layers, or from lower layers to higher layers. Information, signals, and so on may be input and output via a plurality of network nodes.

The information, signals, and so on that are input and/or output may be stored in a specific location (for example, in a memory), or may be managed in a control table. The information, signals, and the like to be input and output can be overwritten, updated, or appended. The output information, signals, and the like may be deleted. The information, signals, and so on that are input may be transmitted to other pieces of apparatus (other apparatus).

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. The RRC signaling may be referred to as an RRC message, and may be, for example, an RRC connection setup message, an RRC connection reconfiguration message, and the like. Notification of the MAC signaling may be performed using, for example, an MAC control element (CE).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a certain value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a radio technology (infrared rays, microwaves, and the like), at least one of the wired technology or the radio technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be called a term such as macro cell, small cell, femto cell, or pico cell.

The base station can accommodate one or more (for example, three) cells. In a case in which the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station or a mobile station may be referred to as a transmitting apparatus, a receiving apparatus, a radio communication apparatus, or the like. Note that at least one of the base station or the mobile station may be a device mounted on a moving object, a moving object itself, and the like. The moving object may be a transportation (for example, a car or an airplane), an unmanned moving object (for example, a drone or an autonomous car), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Base station in the present disclosure may be replaced with user terminal. For example, each aspect/embodiment of the present disclosure may be applied to a configuration in which communication between the base station and the user terminal is replaced with communication among a plurality of user terminals (which may be referred to as, for example, device-to-device (D2D) or vehicle-to-everything (V2X)). In this case, the user terminal 20 may have the function of the above-described base station 10. Words such as "uplink" and "downlink" may be replaced with words corresponding to terminal-to-terminal communication (for example, "side"). For example, uplink channel and downlink channel may be replaced with side channel.

Likewise, the user terminal in the present disclosure may be replaced with a base station. In this case, the base station 10 may be configured to have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. The order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented particular order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. A plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second", and so on as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The terms "judging (determining)" as used in the present disclosure may encompass a wide variety of operations. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some operation.

In addition, to "judge (determine)" may be replaced with "assuming", "expecting", "considering", and so on.

The terms "connected" and "coupled", or any variation thereof used in the present disclosure mean all direct or indirect connections or coupling between two or more elements, and can include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected, these elements may be considered to be "connected" or "coupled" to each other by using one or more electrical wires, cables, printed electrical connections, and the like, and by using, as some non-limiting and non-inclusive examples, electromagnetic energy having a wavelength in the radio frequency domain, microwave domain, and optical (both visible and invisible) domain, and the like.

In the present disclosure, the phrase "A and B are different" may mean "A and B are different from each other". Note that the phrase may mean that "A and B are different from C". The terms such as "leave", "coupled", and the like may be interpreted similarly to "different".

When "include", "including", and variations thereof are used in the present disclosure, these terms are intended to be inclusive similarly to the term "comprising". The term "or" used in the present disclosure is intended not to be exclusive-OR.

In the present disclosure, when English articles such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be implemented as various corrected and changed aspects without departing from the gist and the scope of the invention decided based on the description of claims. Consequently, the description of the present disclosure is provided only for the purpose of explaining examples, and should by no means be construed to limit the invention according to the present disclosure in any way.

The present application is based on Japanese Patent Application No. 2021-135132 filed on Aug. 20, 2021. All the contents of the present application are incorporated herein.

The invention claimed is:

1. A terminal comprising:

a processor that when a radio resource control (RRC) information element (IE) including a subslotLengthForPUCCH is not configured, uses, for transmission of a plurality of physical uplink control channel (PUCCH) repetitions, a first scheme for transmitting the plurality of PUCCH repetitions over a plurality of slots, and when the RRC IE including the subslotLengthForPUCCH is configured, uses, for transmission of the plurality of PUCCH repetitions, a second scheme for transmitting the plurality of PUCCH repetitions over a plurality of sub-slots; and a transmitter that transmits the plurality of PUCCH repetitions.

2. The terminal according to claim 1, wherein the transmitter further transmits capability information indicating support of the second scheme.

3. The terminal according to claim 1, further comprising a receiver that receives downlink control information (DCI) indicating a number of repetitions of the plurality of PUCCH repetitions.

4. A radio communication method for a terminal, comprising:

when a radio resource control (RRC) information element (IE) including a subslotLengthForPUCCH is not configured, using, for transmission of a plurality of physical uplink control channel (PUCCH) repetitions, a first scheme for transmitting the plurality of PUCCH repetitions over a plurality of slots, and when the RRC IE including the subslotLengthForPUCCH is configured, using, for transmission of the plurality of PUCCH repetitions, a second scheme for transmitting the plurality of PUCCH repetitions over a plurality of sub-slots; and transmitting the plurality of PUCCH repetitions.

5. A base station comprising:

a processor that when a radio resource control (RRC) information element (IE) including a subslotLength- ForPUCCH is not configured, uses, for reception of a plurality of physical uplink control channel (PUCCH) repetitions, a first scheme for receiving the plurality of PUCCH repetitions over a plurality of slots, and when the RRC IE including the subslotLengthForPUCCH is configured, uses, for reception of the plurality of PUCCH repetitions, a second scheme for receiving the plurality of PUCCH repetitions over a plurality of sub-slots; and a receiver that receives the plurality of PUCCH repetitions.

6. A system comprising a terminal and a base station, wherein the terminal comprises:

a processor that when a radio resource control (RRC) information element (IE) including a subslotLength-ForPUCCH is not configured, uses, for transmission of a plurality of physical uplink control channel (PUCCH) repetitions, a first scheme for transmitting the plurality of PUCCH repetitions over a plurality of slots, and when the RRC IE including the sub-slotLengthForPUCCH is configured, uses, for transmission of the plurality of PUCCH repetitions, a second scheme for transmitting the plurality of PUCCH repetitions over a plurality of sub-slots; and a transmitter that transmits the plurality of PUCCH repetitions, and the base station comprises:

a receiver that receives the plurality of PUCCH repetitions.

* * * * *